(12) United States Patent  
Sapija et al.

(10) Patent No.: US 11,906,069 B2  
(45) Date of Patent: Feb. 20, 2024

(54) COMPLIANT JOINT DRIVE ASSEMBLY (71) Applicant: Goodrich Corporation, Charlotte, NC (US)

(72) Inventors: Dariusz Sapija, Kiełczówek (PL); Łukasz Turek, Wrocław (PL); Piotr Zając, Wrocław (PL); Mikolaj Niewodniczanski, Wysoka (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/943,570

(22) Filed: Sep. 13, 2022

(65) Prior Publication Data  
US 2023/0079935 A1 Mar. 16, 2023

(30) Foreign Application Priority Data  
Sep. 13, 2021 (EP) .................................... 21461591

(51) Int. Cl.  
*F16K 31/04* (2006.01)  
*F16D 3/74* (2006.01)  
(Continued)

(52) U.S. Cl.  
CPC ........ *F16K 31/043* (2013.01); *B29C 65/4855* (2013.01); *B29C 65/542* (2013.01);  
(Continued)

(58) Field of Classification Search  
CPC ...... F16K 31/047; F16K 31/055; F16K 31/60; F16K 31/041; F16K 5/0647; F16D 1/10;  
(Continued)

(56) References Cited

U.S. PATENT DOCUMENTS 2,943,464 A 7/1960 Voges  
4,034,575 A 7/1977 Barth  
(Continued)

FOREIGN PATENT DOCUMENTS

DE 102017128501 A1 * 6/2019 ............ B29C 70/44

OTHER PUBLICATIONS

European Search Report for Application No. 21461591.6, dated Mar. 7, 2022, 9 pages.

*Primary Examiner* — Marina A Tietjen  
(74) *Attorney, Agent, or Firm* — CANTOR COLBURN LLP (57) ABSTRACT

A method of forming a dielectric barrier and torque transfer member between a drive shaft and a driven shaft of a torque transfer assembly. The method includes assembling the drive shaft and the driven shaft in axially adjacent relationship to one another, the drive shaft and the driven shaft each having a recess formed therein such that when the shafts are assembled, the recesses cooperate to define a chamber extending across the interface between the drive and driven shaft and into the interior of both the drive and the driven shaft. The method further includes injecting a dielectric adhesive or resin material into the chamber to fill the chamber and to extend across the interface between the drive and the driven shaft, and curing the dielectric material to form a dielectric barrier between and to provide torque transfer between the drive and the driven shaft.

13 Claims, 5 Drawing Sheets

(51) Int. Cl.
   *F16K 5/06*    (2006.01)
   *B29C 65/48*   (2006.01)
   *B29C 65/54*   (2006.01)
   *F16K 1/14*    (2006.01)
   *B29L 31/00*   (2006.01)

(52) U.S. Cl.
   CPC ........ *F16K 1/14* (2013.01); *B29K 2995/0006* (2013.01); *B29L 2031/7506* (2013.01)

(58) Field of Classification Search
   CPC ........... F16D 1/101; F16D 3/58; H01B 17/58; B29K 2995/0006; B29C 65/542
   See application file for complete search history.

(56) References Cited

U.S. PATENT DOCUMENTS

| | | |
|---|---|---|
| 8,172,198 B2 | 5/2012 | Dorsey et al. |
| 2008/0041476 A1 | 2/2008 | Campany et al. |
| 2013/0242487 A1* | 9/2013 | Fujioka .................... H05K 7/02 |
| | | 361/679.01 |
| 2013/0341069 A1 | 12/2013 | Demaretz |
| 2020/0262032 A1 | 8/2020 | Heitkamp |
| 2020/0376635 A1 | 12/2020 | Raskin et al. |

\* cited by examiner

COMPLIANT JOINT DRIVE ASSEMBLY

CROSS-REFERENCE TO RELATED APPLICATIONS

This application claims priority to European Patent Application No. 21461591.6 filed Sep. 13, 2021, the entire contents of which is incorporated herein by reference.

TECHNICAL FIELD

The present disclosure relates to a compliant joint drive assembly whereby torque is transmitted from one end of the assembly to the other, the two ends joined by a compliant joint. An example of such an assembly is a ball valve assembly and, in particular, an assembly for a motorised ball valve. A method of manufacturing such an assembly is also described.

BACKGROUND

Drive assemblies are used in many applications where a driving force is provided by an actuator such as a manual lever or a motor and the torque from the actuator is transmitted to a movable part along a drive line. For example, a valve may include a valve closure that is rotated by an actuator, either manually by means of a lever or handle or by means of a motor. The drive force from the motor is transmitted to the valve closure along a shaft arrangement, the shaft configured to transfer torque from the actuator to the valve closure. Particularly where the actuator is an electric motor, there is often a need to provide dielectric separation between the electrics and the moveable part especially if the movable part is in e.g. a wet environment, to avoid damage to the 'dry' motor end. On the other hand, it is necessary to maintain torque transmission along the entire drive line.

Ball valves are valves for controlling flow of a fluid e.g. water. The valve includes a ball shaft having a hole therethrough. The ball shaft is rotatable relative to the fluid flow channel such that when the hole is aligned with the channel, the valve allows fluid flow. To stop flow, the ball shaft is rotated so that the hole is not aligned with the flow. Ball valves can be operated manually e.g. by means of a handle for rotating the ball. Actuated ball valves are operated by a motor, which moves the ball shaft between the open and closed positions. Ball valves find use in e.g. sanitation or water systems. One application of a valve moved by an electric motor is in an aircraft water supply system. Aircraft commonly have a water supply system for providing potable water to various outlets e.g. to sinks or wash basins, coffee machines, toilets, etc. One or more valve assemblies is provided in the system for the various outlets and at least some of these are driven by an electric motor so that they can be operated remotely or automatically. Such a system is described e.g. in U.S. Pat. No. 8,172,198. The use of actuated ball valves is, however, not limited to aircraft water systems and there are many other fields of application for such systems.

Actuated ball valves comprise the motor and drive part, also known as the 'dry' part, and the ball shaft part, which comes into contact with the water, also known as the 'wet' part. Seals need to be provided between the wet part and the dry part to avoid damage to the assembly by water getting to the electric motor.

In aircraft systems and in other water systems, the valve ball shaft often has to be made of metal to satisfy durability and safety standards. Problems may occur with the valve if a fault in the electric motor transmits to the ball shaft due to the conductive path between the various metal parts.

The inventors have identified a need for a dielectric barrier to be provided between the two ends of a drive train e.g. between the ball shaft and the electric drive part of a ball valve assembly. The design should be capable of transmitting torque from the actuator end of the drive to the moveable part even in the event that the moveable part experiences some resistance e.g. becomes jammed or frozen such that a short torque peak is experienced.

SUMMARY

According to the disclosure, there is provided a torque transfer assembly comprising a drive shaft and a driven shaft and a dielectric insert positioned between the drive shaft and the driven shaft, the insert comprising a dielectric adhesive or epoxy resin material injected between the drive shaft and the driven shaft to form an insulating layer and to extend into the drive shaft and into the driven shaft, the insulating layer providing a dielectric barrier and torque transfer member between the drive shaft and the driven shaft.

The insert may have anon-circular cross-section e.g. in the form of lobes or ribs and is received in correspondingly shaped recesses in the drive shaft and the driven shaft.

The insert may be incorporated in a ball shaft assembly comprising a ball shaft as the driven shaft. A motor may be arranged to drive the ball shaft via a cam shaft, as the drive shaft, the insert being located between and in torque transfer engagement with the ball shaft and the cam shaft.

The ball shaft may be part of a water supply system e.g. an aircraft water supply system.

Also provided is a method of forming a dielectric barrier and torque transfer member between a drive shaft and a driven shaft of a torque transfer assembly, the method comprising assembling the drive shaft and the driven shaft in axially adjacent relationship to one another, the drive shaft and the driven shaft each having a recess formed therein such that when the shafts are assembled, the recesses cooperate to define a chamber extending across the interface between the drive and driven shaft and into the interior of both the drive and the driven shaft, the method further comprising injecting a dielectric adhesive or resin material into the chamber to fill the chamber and to extend across the interface between the drive and the driven shaft, and curing the dielectric material to form a dielectric barrier between and to provide torque transfer between the drive and the driven shaft.

In one example, a support structure for the dielectric material is provided in the chamber between and extending across the interface between the drive and the drive shafts to provide a frame for the injected dielectric material.

The support structure may be formed as a thin lattice or cage structure around which the dielectric material can shape and cure.

In some examples, the support structure can be made of a light-weight non-conductive material and so can remain in place as part of the dielectric barrier after the dielectric material has cured.

Alternatively, a more robust material such as a light metal, e.g. aluminium can be used during the manufacturing process. Such materials provides good strength and reinforcement to the assembly during injection of the dielectric material but cannot remain in the end product since such materials are conductive and would, therefore, break the dielectric barrier. In that case, the support structure needs to be removed or at least any conductive paths formed by the support structure across the interface between the drive and the driven shaft need to be isolated. One way to achieve this is to burn parts of the structure away e.g. by exposing the material to a very high voltage, to break any conductive paths. The degree to which the integrity of a complete dielectric barrier must be retained depends on the application of the assembly.

The support structure can be made in conventional ways or using additive manufacturing. Additive manufacturing is particularly advantageous where the structure is an intricate lattice formed of many small struts or limbs. With such structures, conventional machining would take an excessive amount of time and labour and the structure would be prone to breaking during manufacture.

BRIEF DESCRIPTION OF THE DRAWINGS

Preferred embodiments will now be described by way of example only, with reference to the drawings in which.

DETAILED DESCRIPTION

Figure 1:
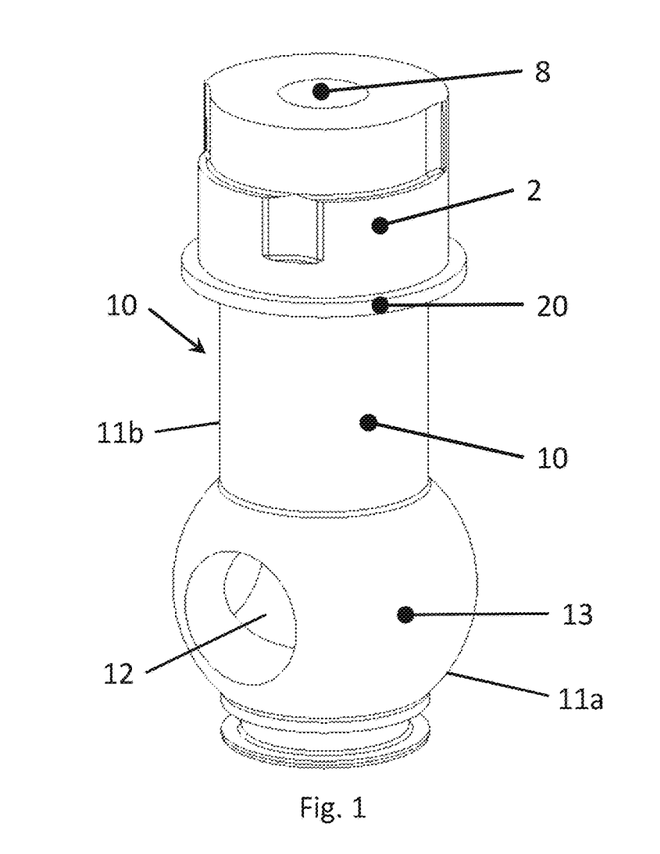
FIG. 1 is a perspective view of a motor driven ball valve assembly that can comprise an insert according to this disclosure.

FIG. 1 is a perspective view of a motorised ball valve assembly including a dielectric insulation component according to the present disclosure.

The operational part of the valve comprises a ball shaft 10 having a head part 11a defining a hole 12 therethrough defining a flow passage, and a shaft part 11b extending from the head for engagement with a drive part of the assembly. In use, the valve is arranged in a water or fluid pipe system such that in a first rotational position of the ball shaft 10, the hole is aligned with a fluid pipe to form a flow passage from the pipe and through the hole 12. To switch off the flow, the ball shaft is rotated e.g. by one quarter turn, so that the hole is no longer aligned with the pipe and, instead, flow from the pipe is blocked by the body 13 of the ball shaft. Valves with several positions and several input/output ports are known.

In a motorised ball valve, the ball shaft is rotated by means of an electric motor (not shown). The electric motor drives a cam shaft 2 which engages with the ball shaft 10. The cam shaft 2 is provided with a hole 8 for connecting the assembly to a shaft of the motor via a key feature (not shown). Rotation of the motor causes rotation of the motor shaft which, in turn, rotates the cam shaft 2 which rotates the ball shaft 10. Seals e.g. O-rings (not shown) are provided around the ball shaft 10 to prevent water passing into the electric part of the assembly. The cam shaft may be provided with indicators such as microswitches (not shown) which can be mounted in recesses or races on the cam shaft 2, or other forms of sensors or indicators, to provide an indication of the angular position of the shaft. These components are standard for a motorised ball valve such as described in U.S. Pat. No. 8,172,198.

In the event that the motor fails, there is not only the risk of an electrical fault being transmitted to the wet end of the assembly, but there is also the problem that a motor failure will mean that the ball shaft cannot be rotated. In the event of failure of the motor, it may be necessary to change the position of the ball shaft to switch flow on or off. To address this, a manual handle (not shown) may be provided in close fitting arrangement around the ball shaft so that manual operation of the handle can rotate the ball shaft 10. The handle can be fitted to the ball shaft such that there is a form fitting or frictional engagement between them. Alternatively, a fixing element e.g. a locking pin (not shown) may be provided to secure the handle to the shaft.

As mentioned above, to provide the required strength and to satisfy other standards such as safety, life and hygiene standards, the various shafts and the key feature will often be made of metal e.g. steel. If there is a problem with the electrics at the motor end of the assembly, these would be transmitted directly to the ball shaft and can cause problems such as electric shocks or arcing. To avoid this problem, the assembly of the present disclosure includes a dielectric insulator insert 20 to be fitted between the ball shaft 10 (or, more generally, driven end) and the electric motor (or, more generally, drive end).

Figure 2:
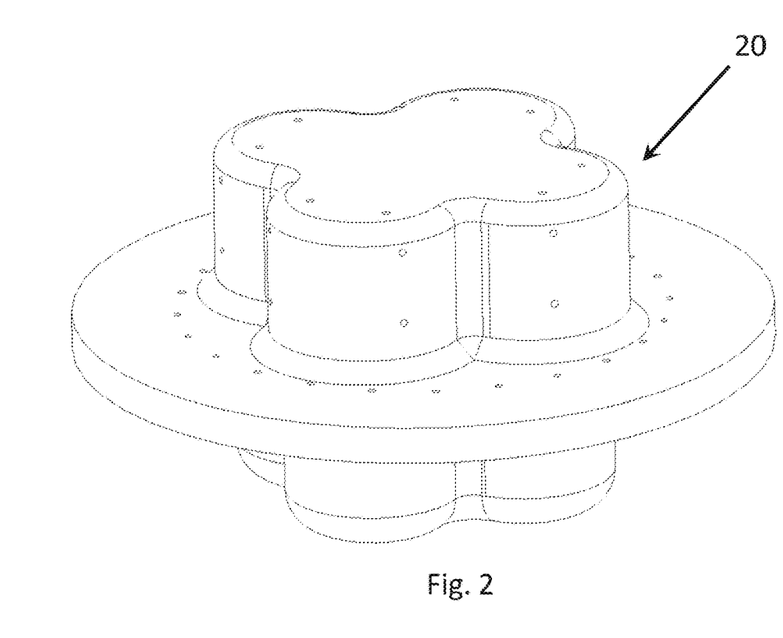
FIG. 2 is a perspective view of a dielectric insert according to the disclosure.

The dielectric insulation insert is structured to have dielectric properties and is shaped to provide torque transmission from the electric motor to the ball shaft 10. The shape of the insert should be such as to be able to withstand a short torque peak if the ball shaft end is fixed or blocked. To achieve the torque transfer property, the insert may be shaped to define alternating lobes and valleys, or ribs, that engage with corresponding engagement features provided at the ball shaft and the cam shaft. The important thing is that the insert has a shape that can engage with the shafts between which it is located in a manner that torque applied to one of the shafts is transferred to the other shaft via the insert.

Figure 3:
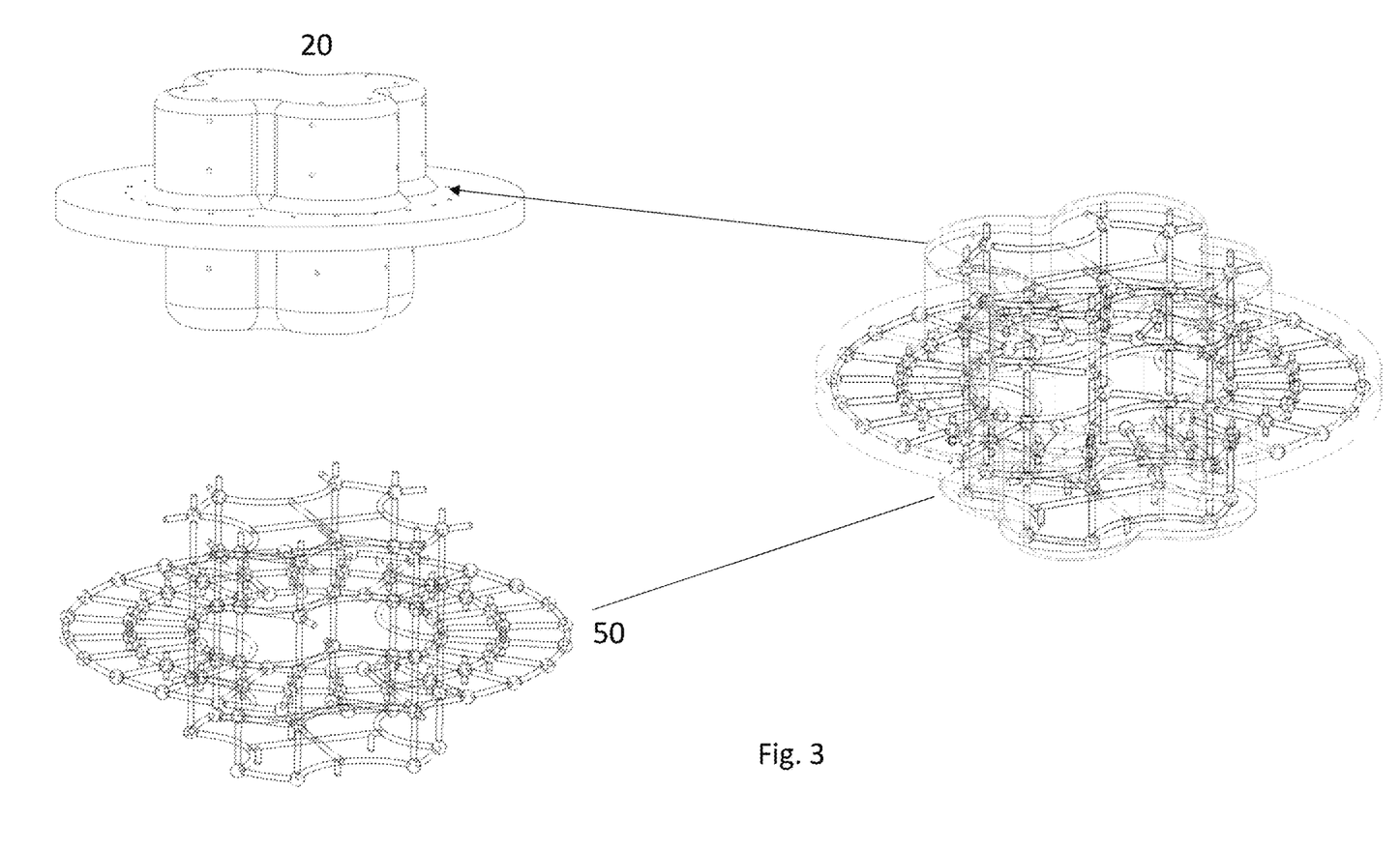
FIG. 3 is an expanded view of the insert of FIG. 2 according to a second example, showing its component parts.

The insert according to the disclosure may have different forms, as will be described further below, but it is a discrete component made from a body of dielectric material and has a shape arranged to mate with a corresponding shape on the cam shaft and/or the ball shaft or a bushing provided on the ball shaft 10. The mating structure should be such that any misalignment can be accommodated. In an example, particularly for use in wet or harsh environments, all of the components required for torque transfer are made of steel, particularly stainless steel expect for the dielectric insert 20 which functions as a dielectric barrier between the steel parts.

Figure 6A:
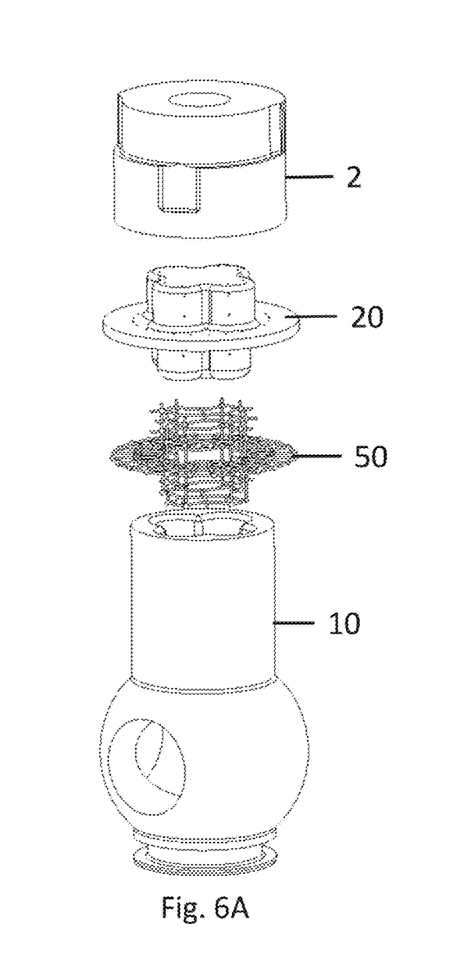
FIGS. 6A and 6B show an exploded view from two different perspectives of an assembly according to the disclosure.
Figure 6B:
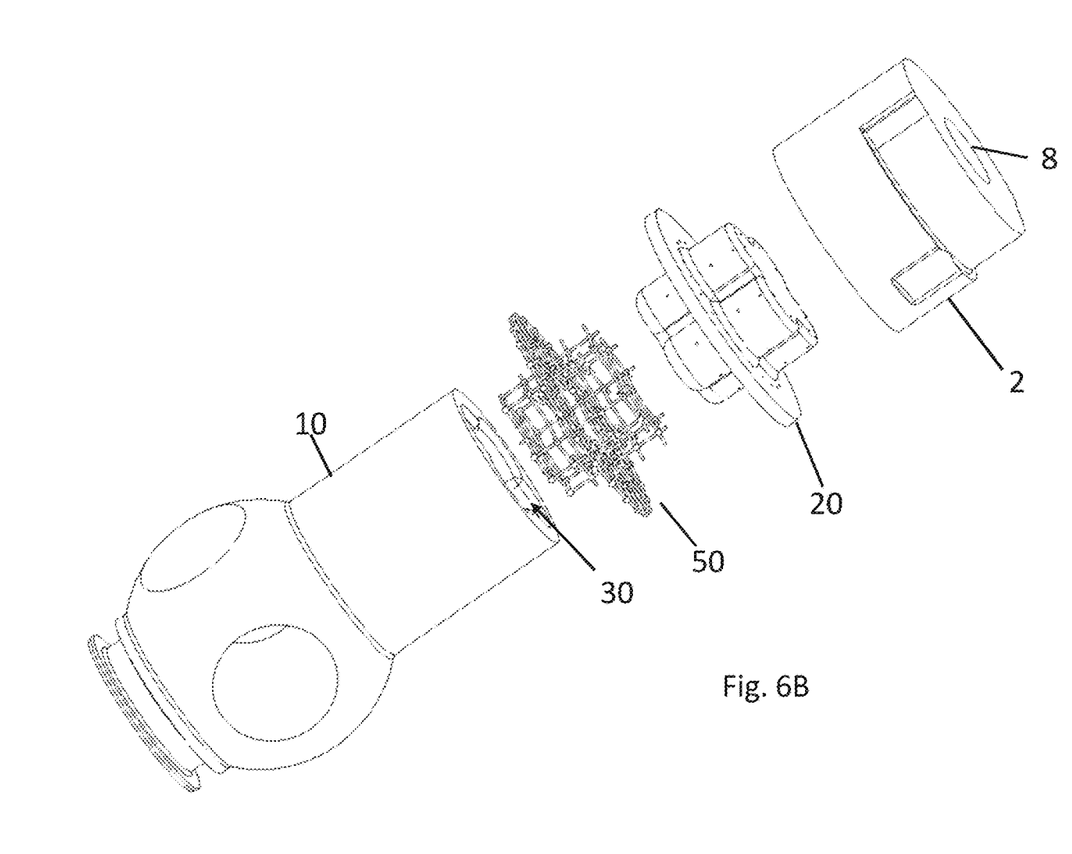

The dielectric insert or barrier according to this disclosure is formed of an adhesive material or an epoxy resin or the like that is injected between the ball shaft and the cam shaft during assembly. The ball shaft and the cam shaft are formed with opposing recesses 30 such that when the ball and the cam shaft are assembled in axial alignment, the recesses cooperate to form a chamber 40 extending across the interiors of the ball shaft and the cam shaft, in which the dielectric insert 20 will be formed.

The dielectric insert 20 is formed in the chamber and at the interface where the ball shaft and the cam shaft meet by injecting the dielectric material, e.g. adhesive or epoxy, into the chamber 40 defined by the ball shaft and cam shaft recesses 30. The material can be injected through an opening or port anywhere in the assembly that provides a flow path to the chamber 40.

Figure 5:
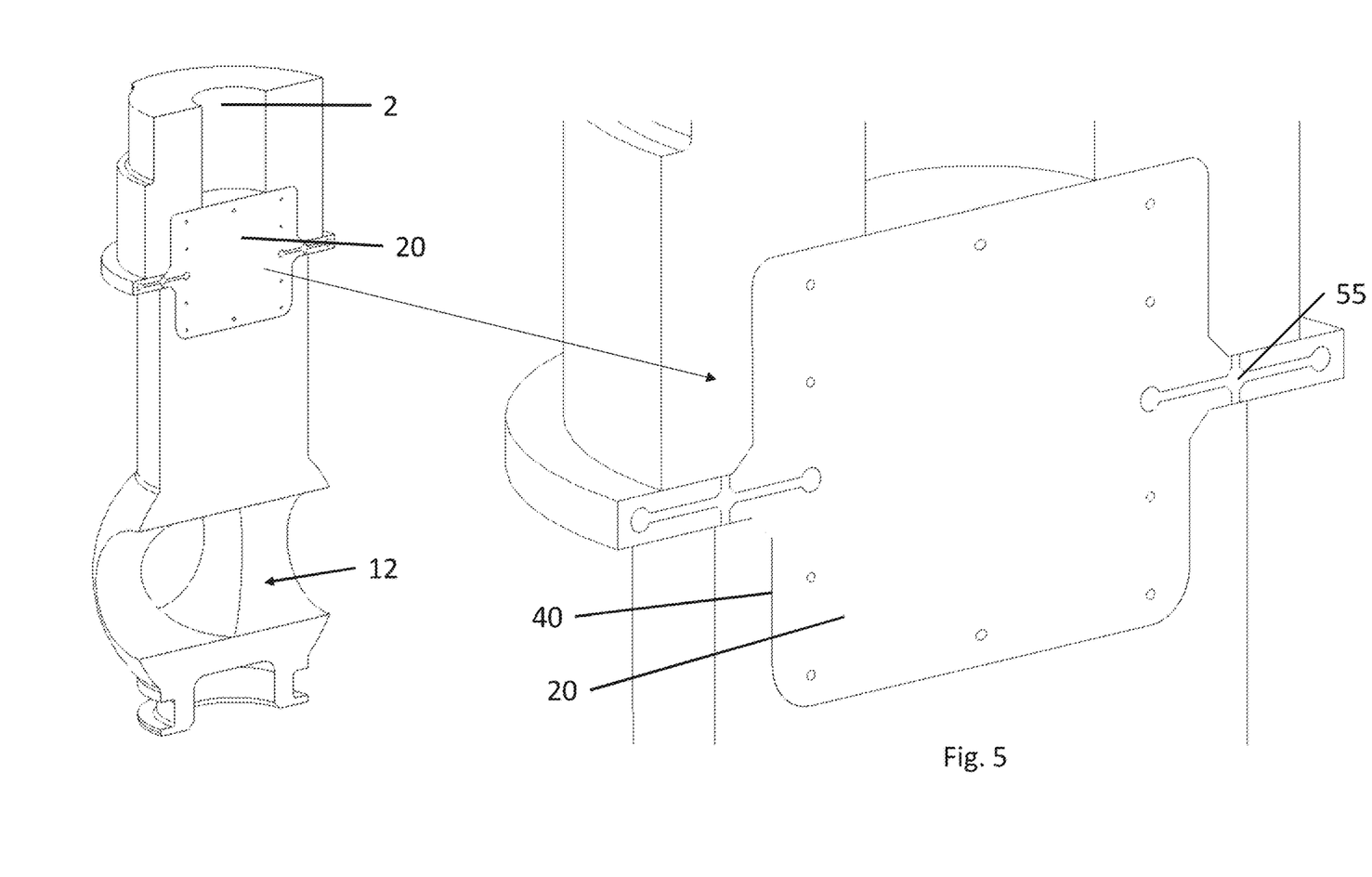
FIG. 5 is a sectional view of an assembly according to the disclosure and a detail thereof.

The ball shaft and cam shaft are assembled such that when the dielectric material is injected, it fills the chamber 40 but also flow to some extent across the interface between the two shafts to form a dielectric barrier that extends across the entire interface as best seen in FIG. 5.

Depending on the dielectric material used, it may be possible to achieve the desired structure by mere injection under particular temperature and pressure conditions such that the material quickly cures in the desired position and shape.

Figure 4:
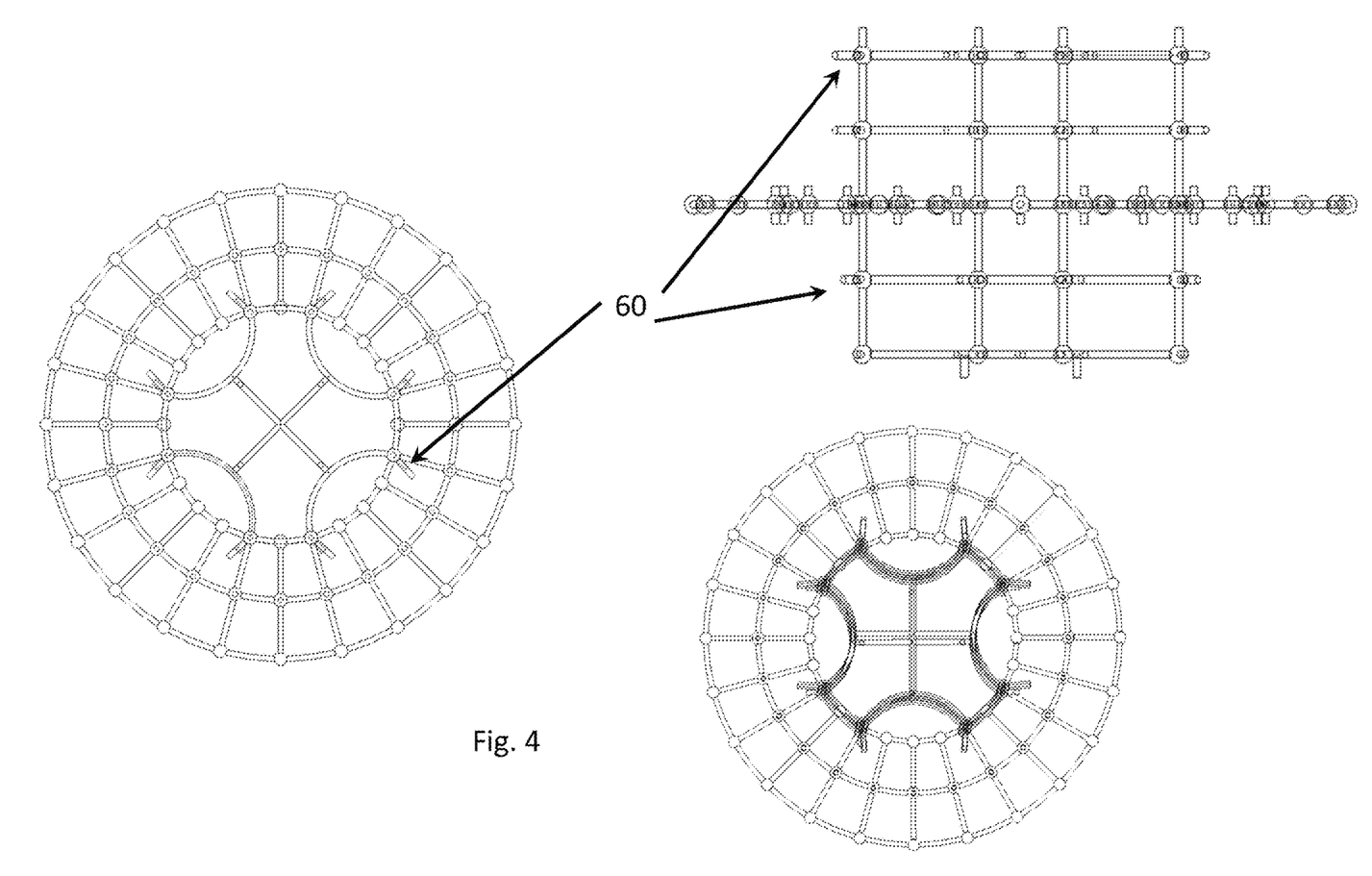
FIG. 4 shows view of one example of a support structure for an assembly in accordance with one example of the disclosure.

In other examples, thought, a support structure 50 is used to define a shape around which the dielectric material can form and set into the desired shape.

The support structure can take various forms, but is preferably a cage or lattice structure of a lightweight but robust material. The support structure 50 is placed in the chamber between the ball shaft and the cam shaft during assembly. Then, the dielectric material is injected into the chamber 40 around the support structure 50 and forms the desired insert shape 20. The material is then cured to form a torque transfer, dielectric barrier member between the ball shaft and the cam shaft.

If the support structure is made of non-conductive material, it can remain embedded in the dielectric material after curing and remains part of the insert. In some cases, though, a stringer support may be needed in which case the support can be formed of e.g. metal such as aluminium. If a conductive material is used for the support structure, it must be at least partly removed during assembly so as to not leave conductive paths across the dielectric insert between the ball shaft and the cam shaft. In the detail of FIG. 5 such conductive paths 55 can be seen. One way of removing such conductive paths is to burn away some of the conductive material by subjecting the support structure to a very high voltage which breaks down the material.

FIG. 4 shows an example of a support structure that may be used in forming the assembly of this disclosure. The structure is formed as a cage or lattice of many very thin struts or legs defining structure and defining spaces therebetween for the dielectric material to form around the struts. The lattice is developed into a three dimensional structure with spikes 60 to hold the dielectric material to some extent.

Once assembled, as the motor rotates the cam shaft 2, the resulting torque is transferred to the ball shaft via the insert 20.

The dielectric insulation assembly provides electrical insulation between the dry and wet parts of the motorised ball valve assembly whilst ensuring torque transfer between the shafts of the respective parts. The insert must therefore have dielectric properties. The material selected should have sufficient strength for torque transfer even in extreme conditions.

The assembly of this disclosure is quick, easy and inexpensive to assemble and, once assembled, coaxiality between the parts is ensured by the adhesion.

The dielectric barrier and compliant joint drive have been described above in the context of a ball shaft valve assembly. This is only an example of where the dielectric barrier can provide advantages and can find application. The dielectric barrier assembly of this disclosure can, however, find application in other assemblies where torque is transmitted between a drive end and a driven end.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A torque transfer assembly comprising:
a drive shaft;
a driven shaft; and
a dielectric insert positioned between the drive shaft and the driven shaft, the insert comprising:
a dielectric adhesive or epoxy resin material injected between the drive shaft and the driven shaft to form an insulating layer and to extend into the drive shaft and into the driven shaft, the insulating layer providing a dielectric barrier and torque transfer member between the drive shaft and the driven shaft;
a support structure embedded in the dielectric material and formed as a thin lattice or cage structure around which the dielectric material is shaped and cured.

2. The assembly of claim 1, wherein the insert has a non-circular cross-section and is received in correspondingly shaped recesses in the drive shaft and the driven shaft.

3. An assembly as claimed in claim 1, wherein the assembly is a ball shaft assembly comprising:
a ball shaft; and
a cam shaft as the driven shaft.

4. A water supply system including the assembly of claim 3.

5. The water supply system of claim 4, being an aircraft water supply system.

6. An assembly as claimed in claim 1, further comprising a motor for rotating the drive shaft.

7. The assembly of claim 6, wherein the motor is an electric motor.

8. A method of forming a dielectric barrier and torque transfer member between a drive shaft and a driven shaft of a torque transfer assembly, the method comprising:
assembling the drive shaft and the driven shaft in axially adjacent relationship to one another, the drive shaft and the driven shaft each having a recess formed therein such that when the shafts are assembled, the recesses cooperate to define a chamber extending across the interface between the drive and driven shaft and into the interior of both the drive and the driven shaft;
injecting a dielectric adhesive or resin material into the chamber to fill the chamber and to extend across the interface between the drive and the driven shaft;
curing the dielectric material to form a dielectric barrier between and to provide torque transfer between the drive and the driven shaft; and
providing a support structure for the dielectric material in the chamber between and extending across the interface between the driven and the drive shafts to provide a frame for the injected dielectric material; and
wherein the support structure is formed as a thin lattice or cage structure around which the dielectric material can shape and cure.

9. The method of claim 8, wherein the support structure is made of a light-weight non-conductive material that remains in place as part of the dielectric barrier after the dielectric material has cured.

10. The method of claim 9, wherein the support structure is made of aluminium.

11. A method of forming a dielectric barrier and torque transfer member between a drive shaft and a driven shaft of a torque transfer assembly, the method comprising:

assembling the drive shaft and the driven shaft in axially adjacent relationship to one another, the drive shaft and the driven shaft each having a recess formed therein such that when the shafts are assembled, the recesses cooperate to define a chamber extending across the interface between the drive and driven shaft and into the interior of both the drive and the driven shaft;

injecting a dielectric adhesive or resin material into the chamber to fill the chamber and to extend across the interface between the drive and the driven shaft;

curing the dielectric material to form a dielectric barrier between and to provide torque transfer between the drive and the driven shaft; and providing a support structure for the dielectric material in the chamber between and extending across the interface between the drive and the driven shafts to provide a frame for the injected dielectric material; and wherein the support structure is at least partly removed after injection of the dielectric material.

12. The method of claim 11, wherein the support structure is at least partly removed by the application of a high voltage.

13. The method of claim 12, wherein the support structure is made of aluminium.

* * * * *